United States Patent [19]

Droin

[11] 4,071,083
[45] Jan. 31, 1978

[54] TUBULAR EXCHANGER

[75] Inventor: René Henri Droin, Saint-Etienne, France

[73] Assignee: Creusot-Loire, Paris, France

[21] Appl. No.: 668,261

[22] Filed: Mar. 18, 1976

[51] Int. Cl.² ............................ F28D 1/04; F28F 9/18
[52] U.S. Cl. .................................... 165/173; 29/157.4
[58] Field of Search ............... 29/157.4; 165/172, 173, 165/175

[56] References Cited

U.S. PATENT DOCUMENTS

| 1,093,435 | 4/1914 | Killebrew | 29/157.4 X |
| 1,252,585 | 1/1918 | Kinnane | 29/157.4 X |
| 1,523,194 | 1/1925 | Gutzwiller | 29/157.4 X |
| 2,047,633 | 7/1936 | Jacobus | 29/157.4 X |
| 2,183,043 | 12/1939 | Kerr | 29/157.4 X |
| 2,209,975 | 8/1940 | Jacobus | 29/157.4 X |
| 2,996,600 | 8/1961 | Gardner, Jr. et al. | 29/157.4 X |
| 2,998,640 | 9/1961 | Huet | 29/157.4 |
| 3,349,465 | 10/1967 | La Pan et al. | 29/157.4 X |
| 3,496,629 | 2/1970 | Martucci et al. | 29/157.4 |
| 3,670,140 | 6/1972 | Roberts | 29/157.4 X |
| 3,750,747 | 8/1973 | Hingorany | 29/157.4 X |

FOREIGN PATENT DOCUMENTS

| 1,457,936 | 11/1966 | France | 29/157.4 |
| 1,387,815 | 3/1975 | United Kingdom | 29/157.4 |

Primary Examiner—Charles J. Myhre
Assistant Examiner—Sheldon Richter
Attorney, Agent, or Firm—Haseltine, Lake & Waters

[57] ABSTRACT

A tubular exchanger for operations under conditions of heat and pressure comprising a set of tubes made of ferritic steel having the following composition:

$C \leq 0.010\%$,
$Cr$ 25 to 30%,
$Mo < 4\%$.

The tubes are provided at each end with relatively short ferrules of austenitic stainless steel which are welded to the tubes.

7 Claims, 1 Drawing Figure

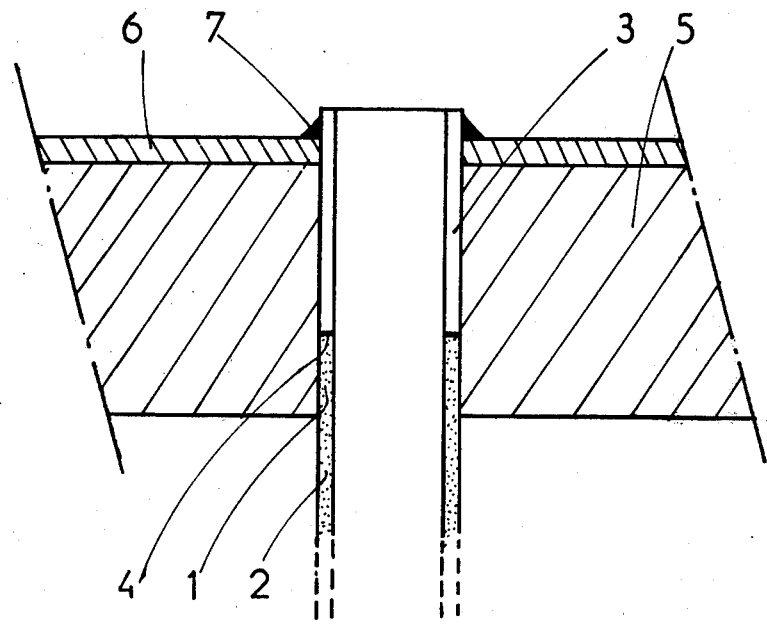

TUBULAR EXCHANGER

FIELD OF THE INVENTION

The present invention relates to improvements in tubular exchangers for working under heat and pressure.

BACKGROUND

Usually the tubes of such exchangers are attached to tube plates which are very thick and consist of carbon or low-alloy steel. They are clad with stainless steel, for example built up by welding. The tubes are of standard dimensions and of stainless steel. These tubular exchangers working under heat and pressure sometimes pose important corrosion problems.

Amongst the various stainless steels which may be employed for exchanger tubes, ferritic steels of high chrome content have been found to be very suitable. The grade, the composition of which is given below, has shown itself to be extremely interesting in a certain number of cases. For example, it resists particularly well corrosion by a urea-carbamate mixture under the conditions of temperature and concentration which are those in urea strippers. The composition of this grade of steel is as follows:

C $\leq$ 0.010%,
Cr: 25 to 30% and preferably equal to 26%,
Mo < 4% and preferably equal to 1%.

It is unfortunately found that welding of such a grade of steel to the welded steel cladding of tube plates poses problems which have not hitherto been solved.

SUMMARY OF THE INVENTION

It is an object of the present invention to solve these welding problems.

According to the present invention there is provided a tubular exchanger for working under heat and pressure, comprising a set of tubes made of ferritic steel of high chrome content having the following composition:

C $\leq$ 0.010%.
Cr: 25 to 30%, and preferably equal to 26%,
Mo < 4%, and preferably equal to 1%, said tubes being terminated at their ends by relatively short tubular ferrules of austenitic stainless steel which are welded to the tubes by a method, e.g. by bombardment of electrons or by friction or by any other suitable method, which confers a low degree of contamination upon the weld bead or upon the zone affected by the heat.

Advantageously, the stainless steel of the ferrules is an austenitic steel having the following composition:

C < 0.020%,
Cr: 20 to 26%,
Ni: 6 to 26%,
Mo: 1 to 5%.

Preferably, the steel of the cladding on the tube plates has the following composition:

C < 0.030%,
Cr: 18 to 22%, and preferably equal to 20%
Ni: 14 to 18%, and preferably equal to 16%
Mo: 1 to 3%, and preferably equal to 2%
Mn: 4 to 6%, and preferably equal to 5%.

The tubes may themselves be made of the same metal as the ferrules but this metal is expensive and it is cheaper to produce composite tubes of which only the ferrules are of austenitic steel.

BRIEF DESCRIPTION OF THE DRAWING

The invention will be more fully understood from the following description of an embodiment thereof, given by way of example only with reference to the accompany drawing of which the single FIGURE is a longitudinal section through a tube and plate of the embodiment.

DETAILED DESCRIPTION

The tubular exchanger is intended to work at a temperature of the order of 185° C and under a pressure of the order of 150 bars. In this apparatus the function of which is an urea stripper, heating is effected by steam outside the tubes and the stripping takes place upon the meeting of the urea-carbamate mixture which flows inside the tubes with carbon dioxide gas blown in through the bottom.

The exchanger comprises a plurality of tubes 2, one of which is shown in the drawing, extending between plates, one of which is shown in the drawing. The exchanger tubes 2 are made of ferritic steel of high chromium content and each has, at each end 1, a ferrule 3 of high-alloy austenitic stainless steel which is welded to the tube at 4. Each tube plate consists of a thick plate 5 of carbon or low-alloy steel clad with a thin layer 6 of austenitic stainless steel to which the ferrules 3 are welded at 7.

The ferritic steel constituting the exchanger tubes 2 has the following composition:

C: 0.003%,
Cr: 26%,
Mo: 1%.

The austenitic steel constituting the ferrules 3 has the following composition:

C: 0.018%,
Cr: 25%,
Ni: 22%,
Mo: 2%.

The welding of the ferrules at 4 to the ends 1 of the tubes 2 is affected, e.g. by bombardment of electrons or by friction, without any particular difficulty.

The thick plate 5 is of ordinary manganese carbon steel.

The austenitic steel of the thin layer 6 has the following composition:

C: 0.025%,
Cr: 20%,
Ni: 16%,
Mo: 2%,
Mn: 5%.

The welding 7 of each ferrule 3 to the thin stainless sheet 6 is effected easily.

Tubular exchangers as described above are particularly good for use under heat and high pressure as is the case in urea strippers.

There is thus provided an exchanger in which the tubes are made of a grade of steel which resists corrosion well, the previous limitations on the conditions of welding to the baseplates are removed and the difficult welding problems are solved by interposition of intermediate ferrules specially chosen to ensure good welding to the baseplate.

Of course one can, without departing from the scope of the invention, conceive of variants and improvements in detail as well as visualizing the use of equivalent means.

What is claimed is:

1. A tubular exchanger for working under heat and pressure, comprising a set of tubes made of ferritic steel of high chrome content having the following composition:
C < 0.010%,
Cr: 25 to 30%,
Mo < 4%,
relatively short tubular ferrules of austenitic stainless steel, weld means joining said ferrules respectively to said tubes with a low degree of contamination, said stainless steel of said ferrules having the following composition:
C < 0.020%,
Cr: 20 to 26%,
Ni: 6 to 26%,
Mo: 1 to 5%,
a tube plate receiving said ferrules, said tube plate being clad with an austenitic stainless steel having the following composition:
C < 0.030%,
Cr: 18 to 22%,
Ni: 14 to 18%,
Mo: 1 to 3%,
Mn: 4 to 6%.
and second weld means joining said ferrules to said cladding of said tube plate.

2. A tubular exchanger as claimed in claim 1, wherein the Cr and Mo content of said steel of said tubes is 26% and 1% respectively.

3. A tubular exchanger as claimed in claim 1, wherein the Cr, Ni, Mo and Mn content of said steel cladding said tube plates is 20%, 16%, 2% and 5% respectively.

4. A tubular exchanger as claimed in claim 1 wherein said tube plates are made of carbon or low-alloy steel.

5. A tubular exchanger as claimed in claim 1 wherein the first weld means is disposed at a location within the thickness of said tube plate.

6. A tubular exchanger for working under heat and pressure, comprising a set of tubes made of ferritic steel, a ferrule of austenitic stainless steel welded to each end of each tube, and a pair of tube plates clad in austenitic stainless steel, said ferrules being welded to said cladding, and wherein said steel of said tubes has the following composition:
C < 0.010%,
Cr: 25 to 30%,
Mo < 4%,
said steel of said ferrules has the following composition;
C < 0.020%,
Cr: 20 to 26%,
Ni: 6 to 26%,
Mo: 1 to 5%,
and said steel of said tube plate cladding has the following composition:
C ≦ 0.030%,
Cr: 18 to 22%,
Ni: 14 to 18%,
Mo: 1 to 3%,
Mn: 4 to 6%.

7. A tubular exchanger as claimed in claim 6 wherein said tube plates are made of carbon or low-alloy steel.

* * * * *

UNITED STATES PATENT OFFICE
CERTIFICATE OF CORRECTION

Patent No. 4,071,083　　　　　　　　　Dated January 31, 1978

Inventor(s) Rene Henri Droin

It is certified that error appears in the above-identified patent and that said Letters Patent are hereby corrected as shown below:

On the title page insert the following priority data:

April 23, 1975　　　　France　　　　75.12589

Signed and Sealed this

Sixteenth Day of May 1978

[SEAL]

Attest:

RUTH C. MASON　　　　　　　　LUTRELLE F. PARKER
Attesting Officer　　　　　Acting Commissioner of Patents and Trademarks